(12) United States Patent
Tsuboi

(10) Patent No.: US 7,821,561 B2
(45) Date of Patent: Oct. 26, 2010

(54) DISPLAY APPARATUS WITH CAMERA AND COMMUNICATION APPARATUS

(75) Inventor: Takayuki Tsuboi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 10/995,853

(22) Filed: Nov. 23, 2004

(65) Prior Publication Data

US 2005/0128332 A1    Jun. 16, 2005

(30) Foreign Application Priority Data

Dec. 12, 2003    (JP)    ............... 2003-415820

(51) Int. Cl.
*H04N 5/222* (2006.01)
*H04N 5/225* (2006.01)
*H04N 11/00* (2006.01)
*H04N 7/00* (2006.01)

(52) U.S. Cl. .................. 348/333.01; 348/340; 348/291; 348/345; 348/273

(58) Field of Classification Search ............ 348/333.01, 348/340, 552, 333, 291, 345, 273; 250/208.1, 250/216, 226
See application file for complete search history.

(56) References Cited

U.S. PATENT DOCUMENTS

| | | | |
|---|---|---|---|
| 4,400,725 A * | 8/1983 | Tanigaki ................... | 348/14.16 |
| 5,159,445 A * | 10/1992 | Gitlin et al. .............. | 348/14.01 |
| 5,340,978 A * | 8/1994 | Rostoker et al. .......... | 250/208.1 |
| 5,400,069 A * | 3/1995 | Braun et al. .............. | 348/14.16 |
| 5,585,695 A * | 12/1996 | Kitai .......................... | 313/506 |
| 5,585,817 A * | 12/1996 | Itoh et al. .................... | 345/104 |
| 5,615,024 A * | 3/1997 | May et al. ...................... | 349/57 |
| 6,069,674 A | 5/2000 | Aomori et al. | |
| 6,137,535 A * | 10/2000 | Meyers ........................ | 348/340 |
| 6,454,414 B1 * | 9/2002 | Ting ............................. | 353/28 |
| 6,559,433 B1 * | 5/2003 | Ozawa ..................... | 250/208.1 |
| 7,009,652 B1 * | 3/2006 | Tanida et al. ................. | 348/340 |
| 7,034,866 B1 * | 4/2006 | Colmenarez et al. ... | 348/211.12 |
| 7,053,967 B2 * | 5/2006 | Abileah et al. ................. | 349/12 |
| 2002/0030768 A1 * | 3/2002 | Wu ............................. | 349/42 |
| 2002/0030775 A1 * | 3/2002 | De Schipper ............... | 349/113 |

(Continued)

FOREIGN PATENT DOCUMENTS

JP    01-286592    11/1989

(Continued)

OTHER PUBLICATIONS

The above references were cited in a Jul. 21, 2009 Japanese Office Action that issued in Japanese Patent Application No. 2003-415820.

*Primary Examiner*—Yogesh K Aggarwal
(74) *Attorney, Agent, or Firm*—Cowan, Liebowitz & Latman, P.C.

(57) ABSTRACT

It discloses a display apparatus with a camera capable of taking an almost full-face image of a person seeing a display. The display apparatus with the camera includes a display element in which display pixels are arranged, and an image-taking module which forms a plurality of object images through a plurality of aperture areas formed among the display pixels of the display element and photoelectrically converts the plurality of object images. Furthermore, the display apparatus includes an image combining section which combines image information on the plurality of object images obtained by using the image-taking module.

7 Claims, 14 Drawing Sheets

U.S. PATENT DOCUMENTS

| | | | |
|---|---|---|---|
| 2002/0032043 A1* | 3/2002 | Ishikawa | 455/566 |
| 2002/0054252 A1* | 5/2002 | Ishii et al. | 349/106 |
| 2003/0193599 A1* | 10/2003 | Campbell et al. | 348/333.01 |
| 2004/0100700 A1* | 5/2004 | Kitamura et al. | 359/622 |
| 2004/0189794 A1* | 9/2004 | Rambo et al. | 348/14.16 |
| 2004/0263670 A1* | 12/2004 | Yamasaki | 348/340 |
| 2006/0007222 A1* | 1/2006 | Uy | 345/207 |

FOREIGN PATENT DOCUMENTS

| | | |
|---|---|---|
| JP | 06-233290 | 8/1994 |
| JP | 06-233291 | 8/1994 |
| JP | 08-195945 | 7/1996 |
| JP | 09-043627 A | 2/1997 |
| JP | 2000-152205 A | 5/2000 |

* cited by examiner

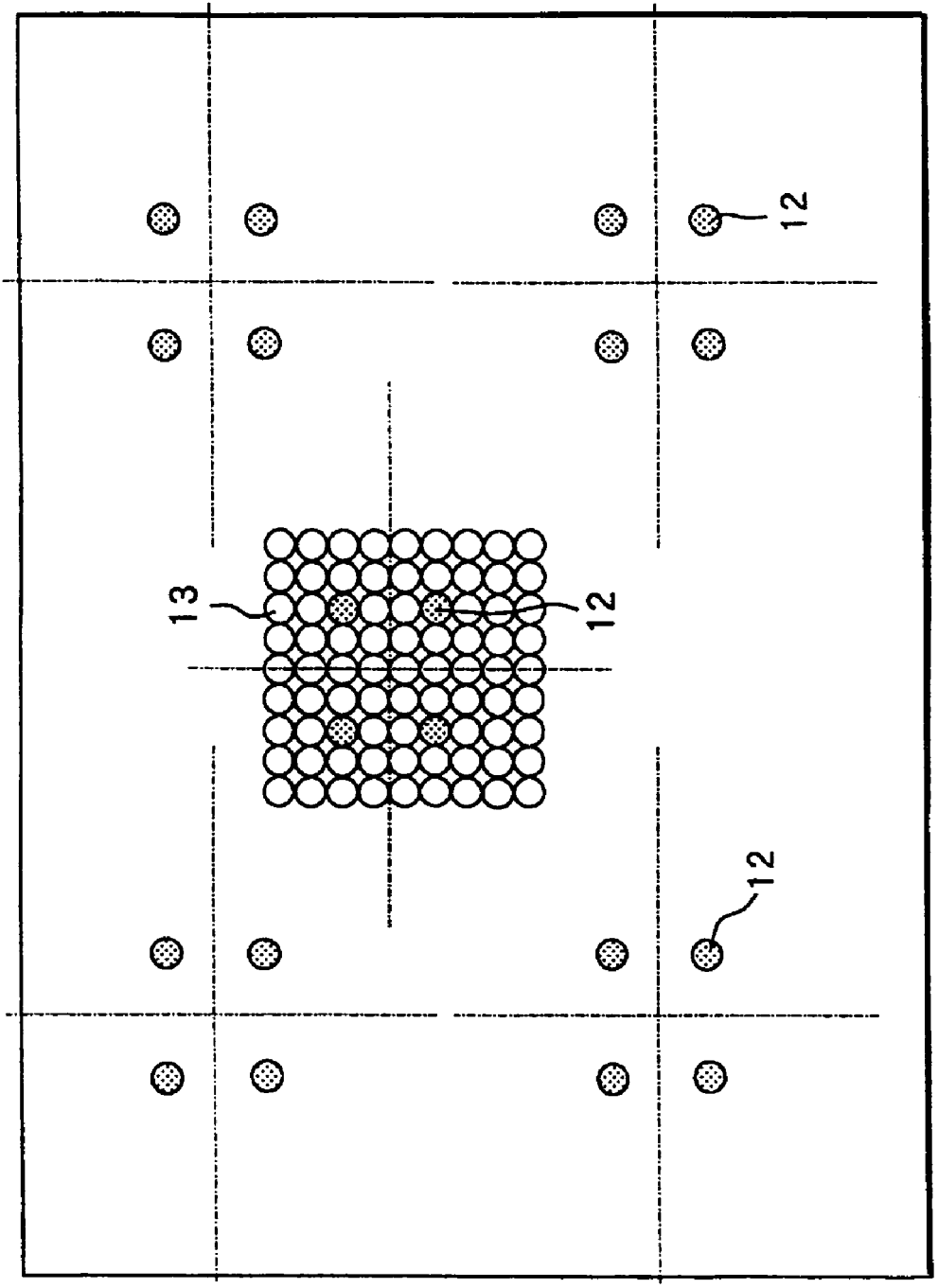

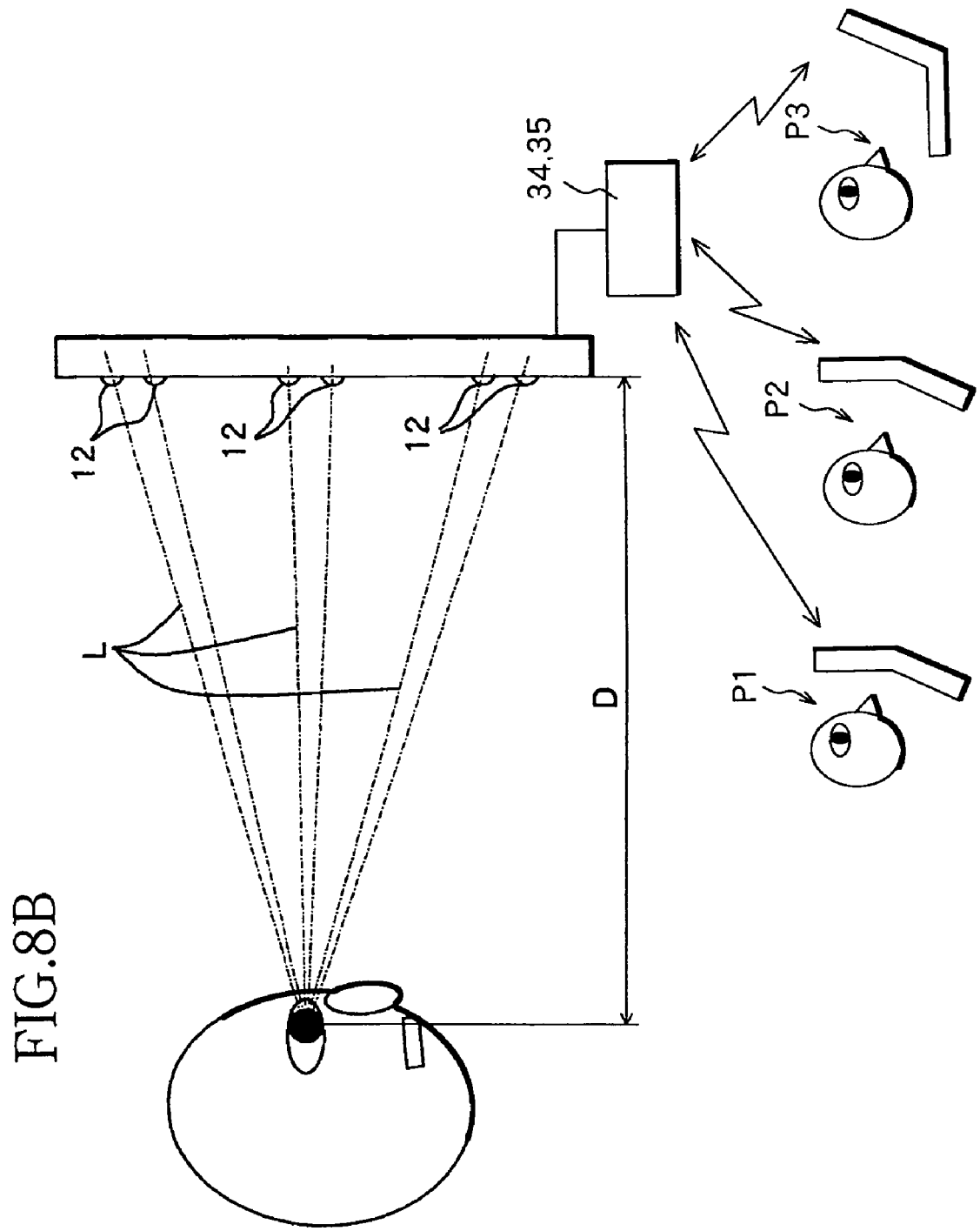

DISPLAY APPARATUS WITH CAMERA AND COMMUNICATION APPARATUS

BACKGROUND OF THE INVENTION

1. Field of the Invention

The present invention relates to a display apparatus used for a video phone, a video-conference and so on, and in particular, to the display apparatus having an image-taking function and a communication apparatus using this.

2. Description of Related Art

In display apparatuses used for a video phone, a video-conference (teleconference) and so on, there is one comprised of a camera which takes images of a user in order to display them on a display on the other side and a display which displays images of the other party taken on the other side so as to make a call while seeing the other party on the display.

Such a display apparatus is constituted so that the image of the other party displayed on the display gets to the user's eye level when seeing the other party on the display, and so it is possible to make a call as if seeing the other party in reality (refer to Japanese Patent Laid-Open Nos. 08-195945 and 01-286592 for instance).

FIG. 12 is a diagram describing a situation in which a conventional display apparatus for the video-conference is used, and FIG. 13 is a diagram describing an optical structure thereof.

In FIG. 12, reference numeral 1 denotes a flat-screen display to be connected to a personal computer (hereafter, referred to as a PC) not shown. Reference numeral 1a denotes a screen in which a face of the other party and documents used for conversation are displayed dividedly on the screen as required. Such a structure is implemented in an ordinary PC environment connected to a communication line such as the Internet.

Reference numeral 2 denotes a table. Reference numeral 3 denotes a video camera for transmitting the user's images to the other party, and includes an optical system shown in FIG. 13 built therein. The video camera 3 is not located between a face 4 and the screen 1a but is located below the screen 1a and out of a field of view when a person 4 sees the screen 1a.

In FIG. 13, reference numeral 3a denotes an image-taking lens (it is comprised of multiple lenses in reality but is shown as one lens in FIG. 13 to simplify a description) built into the video camera 3, and 3b denotes an image-pickup element built into the video camera 3. Reference numeral 5 denotes the image of the person 4 on the image-pickup element 3b.

In such a structure, a line A representing a virtual plane of the person 4 is projected like a plane C through the lens 3a. This is the "Scheimpflug rule" wherein, on specifying a place B vertical to an optical axis of the lens 3a, extensions of these axes A, B and C intersect at one point.

As for the image on the image-pickup element 3b obtained by such a structure, a image-taking magnification on a jaw side is high (due to a short distance) while the image-taking magnification on a crown side is low (long distance). This image is not so desirable.

Regarding the conventional example, however, there has been no proposal to keep a design intact and increase a resolution enough to determine a facial expression of the person as to a flat-screen display becoming mainstream among TV receivers and a thin-shaped display suited to portable telephones and mobile and personal computers.

As a first problem, an eye line of the person seeing the image on the display is approximately at a center of the display. To take an image of the eye line of the person, it is necessary to set a camera having the optical axis at the same location as the center of the same display, which is apt to reduce performance and a quality level as the display apparatus. An example of mounting the camera very close to the screen is thinkable in order to make up for that fault. In that case, however, the eye line cannot be caught inversely, or the face in the image looks as if seen obliquely.

As a second problem, the camera should be capable a focal length of a picture composition to take an image of some surrounding landscape centering on the person's face and having a resolution high enough to determine the facial expression of the person. If the optical system of such a image-taking magnification is built into a flat-screen display apparatus, however, its thickness increases and a precious design of the flat-screen display becomes reduced.

As a third problem, it is required to take an image of the user while seeing the facial expression of the other party (real-time property). In such cases, light for display is apt to become a ghost or a flare of an image-taking system and image quality may be degraded.

SUMMARY OF THE INVENTION

An object of the present invention is to provide a display apparatus with a thin-shaped camera capable of taking an almost full-face image of a person seeing a display.

In order to achieve the above-described object, a display apparatus with the camera according to one aspect of the present invention comprises a display element in which display pixels are arranged, an image-taking module which forms a plurality of object images through a plurality of aperture areas formed among the display pixels on the display element and photoelectrically converts the plurality of object images, and an image combining section which combines image information on the plurality of object images obtained by using the image-taking module.

And, a communication apparatus according to the other aspect of the present invention comprises the display apparatus with the camera and a communication section which performs communication with image information by using the display apparatus.

Furthermore, the communication apparatus according to the other aspect of the present invention comprises the display apparatus with the camera and a plurality of communication apparatuses which perform communication with the image information by using the display apparatus respectively.

Characteristics of the display apparatus with the camera, the communication apparatus and a communication system according to the present invention will be clarified by the following description of concrete embodiments with reference to the drawings.

BRIEF DESCRIPTION OF THE DRAWINGS

FIG. 4A shows four images taken by four lenses, FIG. 4B shows an image in which the four images in FIG. 4A are electrically superimposed, and FIG. 4C is a detailed drawing;

FIG. 6A is the structure of a compound-eye optical system according to the embodiments and FIG. 6B is the structure of a conventional optical system;

FIGS. 8A and 8B are diagrams showing the structure of a video-conference or video phone system using the display apparatus with a camera according to the embodiments, where FIG. 8A is a front view of the display section and FIG. 8B is a side view showing the status of use of the display section;

DETAILED DESCRIPTION OF THE PREFERRED EMBODIMENTS

Figure 12:
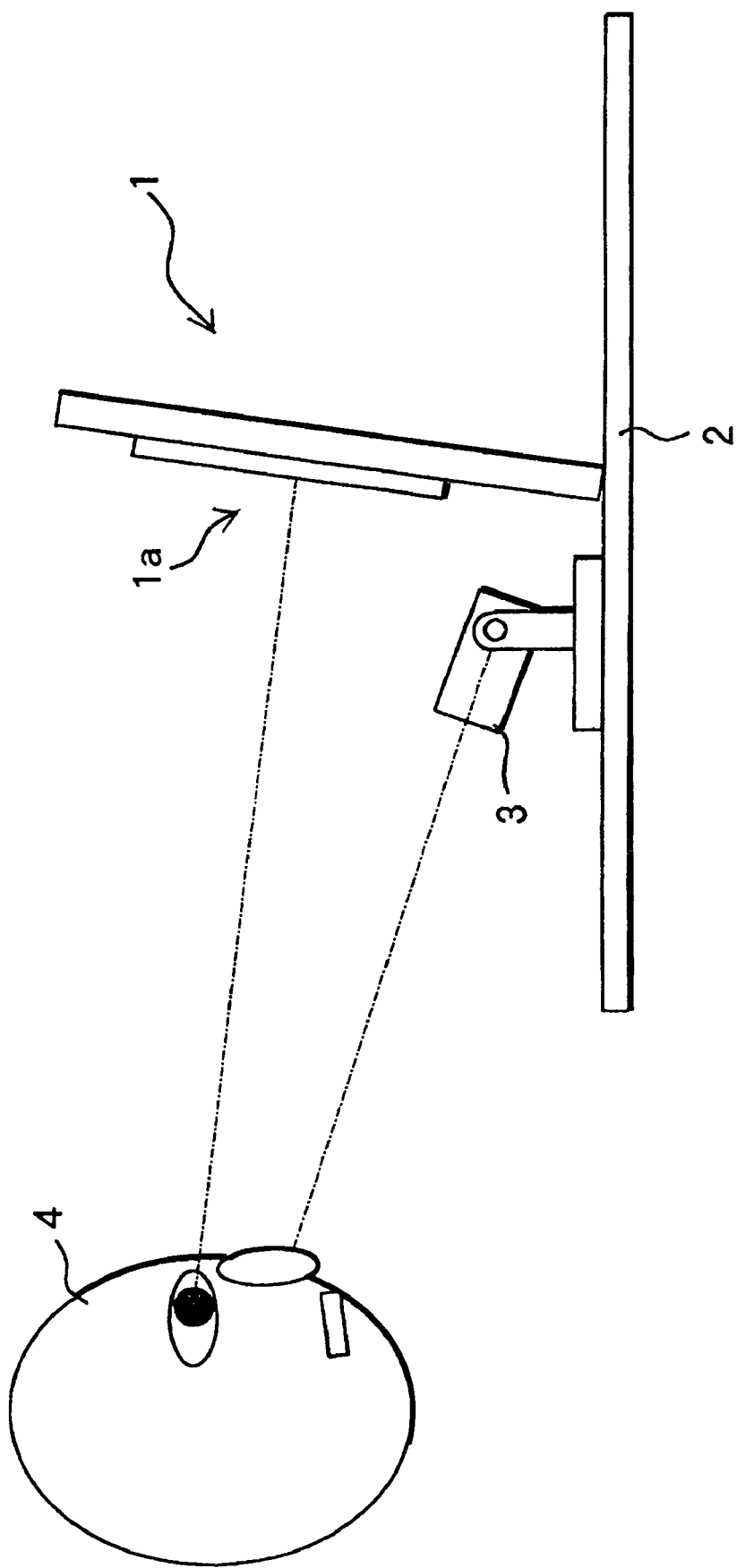
FIG. 12 is a diagram for describing the status of use of the display apparatus for the video-conference of a conventional example.
Figure 13:
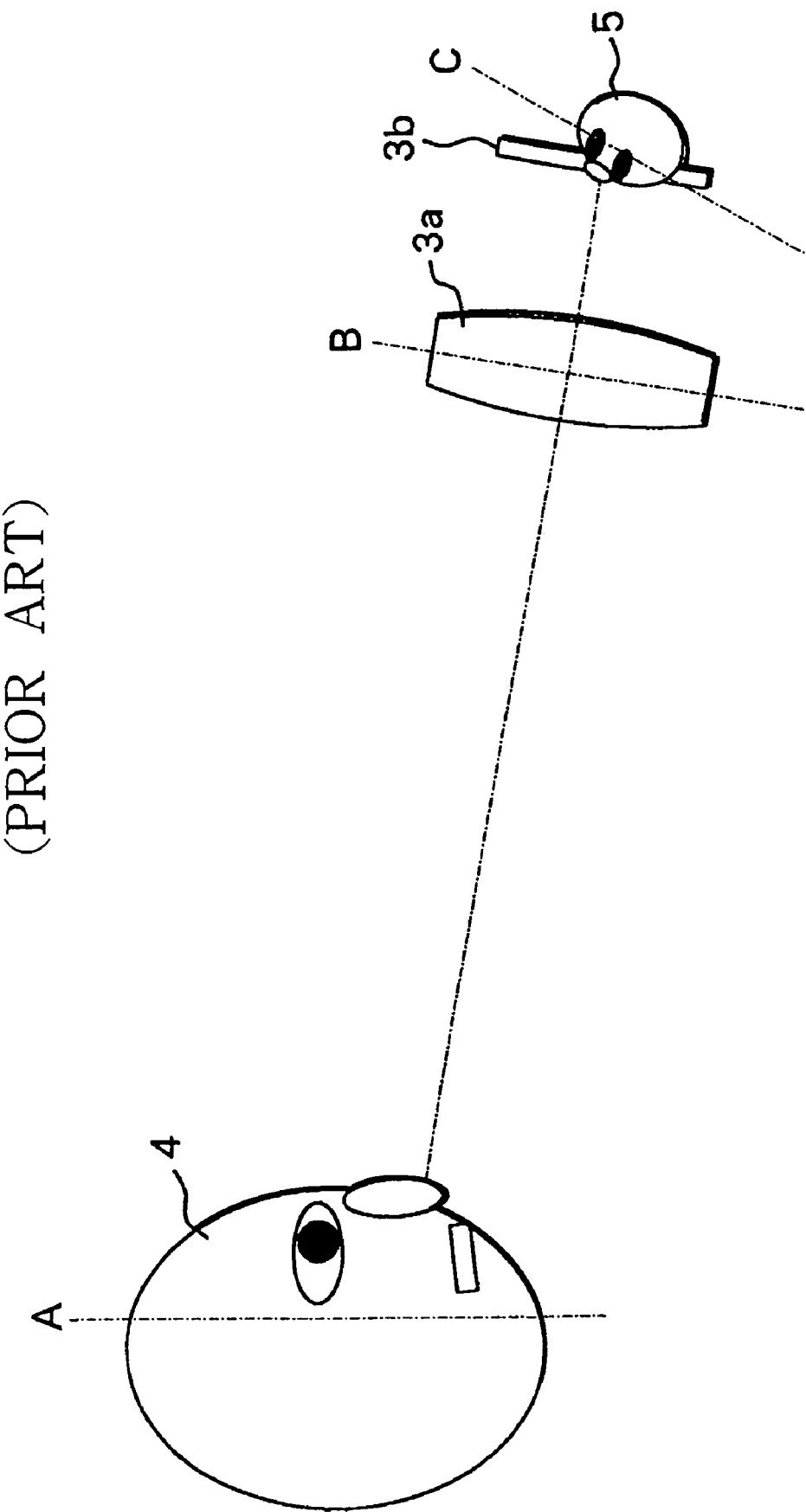
FIG. 13 is a diagram for describing an optical structure of the display apparatus for the video-conference of the conventional example.

Hereafter, embodiments of the present invention will be described by referring to the drawings. In the following description, members having the same structure as conventional examples shown in FIGS. 12 and 13 are given the same symbols. The embodiments will be described by using a portable telephone as an example of a form of a display apparatus according to the present invention.

Figure 3:
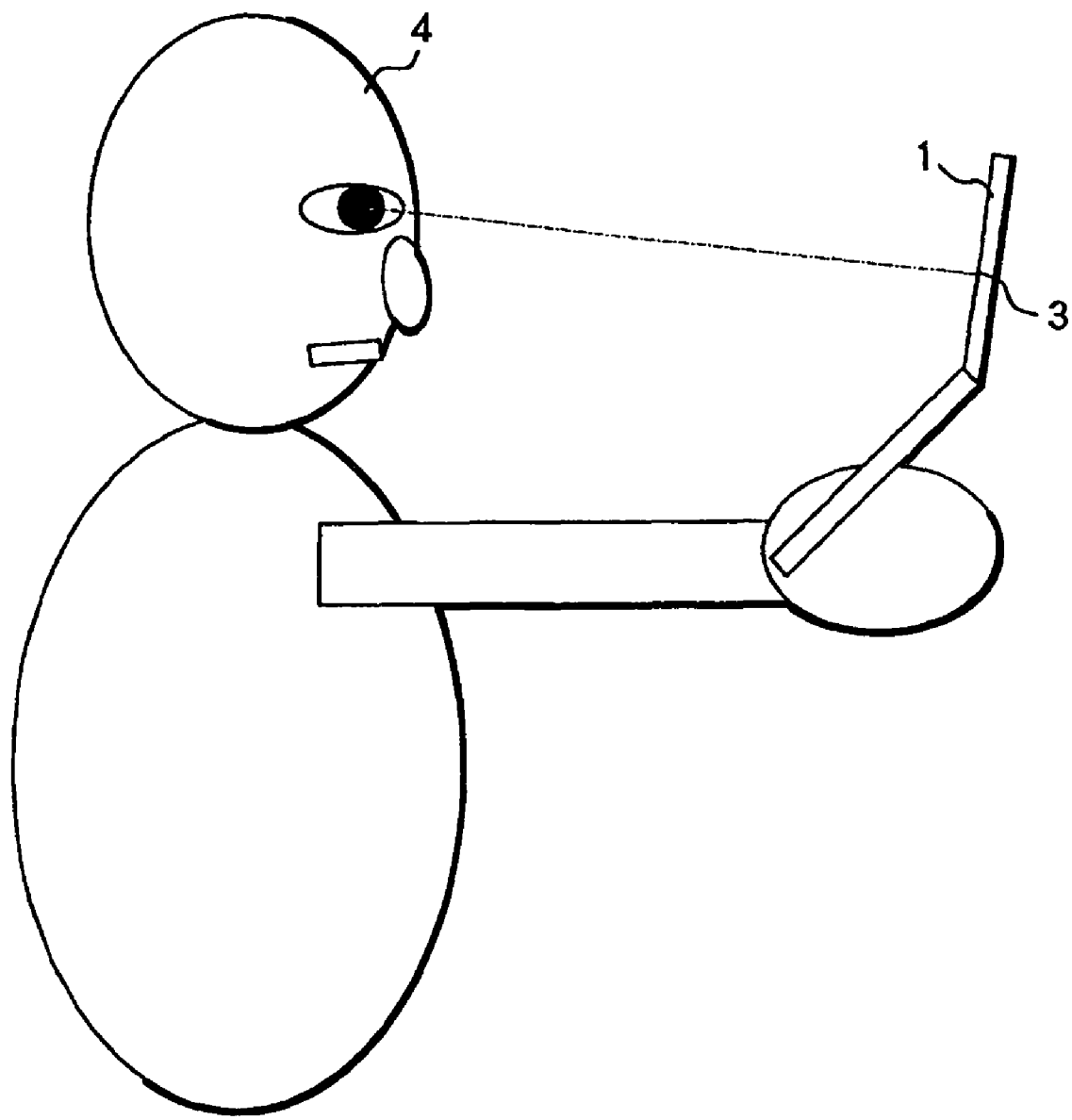
FIG. 3 is a description diagram of a status of use of a portable telephone according to the embodiments.

FIG. 3 is a description diagram of a status of use of the portable telephone (communication apparatus) according to the embodiments. As shown in FIG. 3, the portable telephone according to the embodiments includes a camera 3 built into a display section 1. The camera 3 is arranged facing a direction of an eye line and a face of a person 4.

Figure 1:
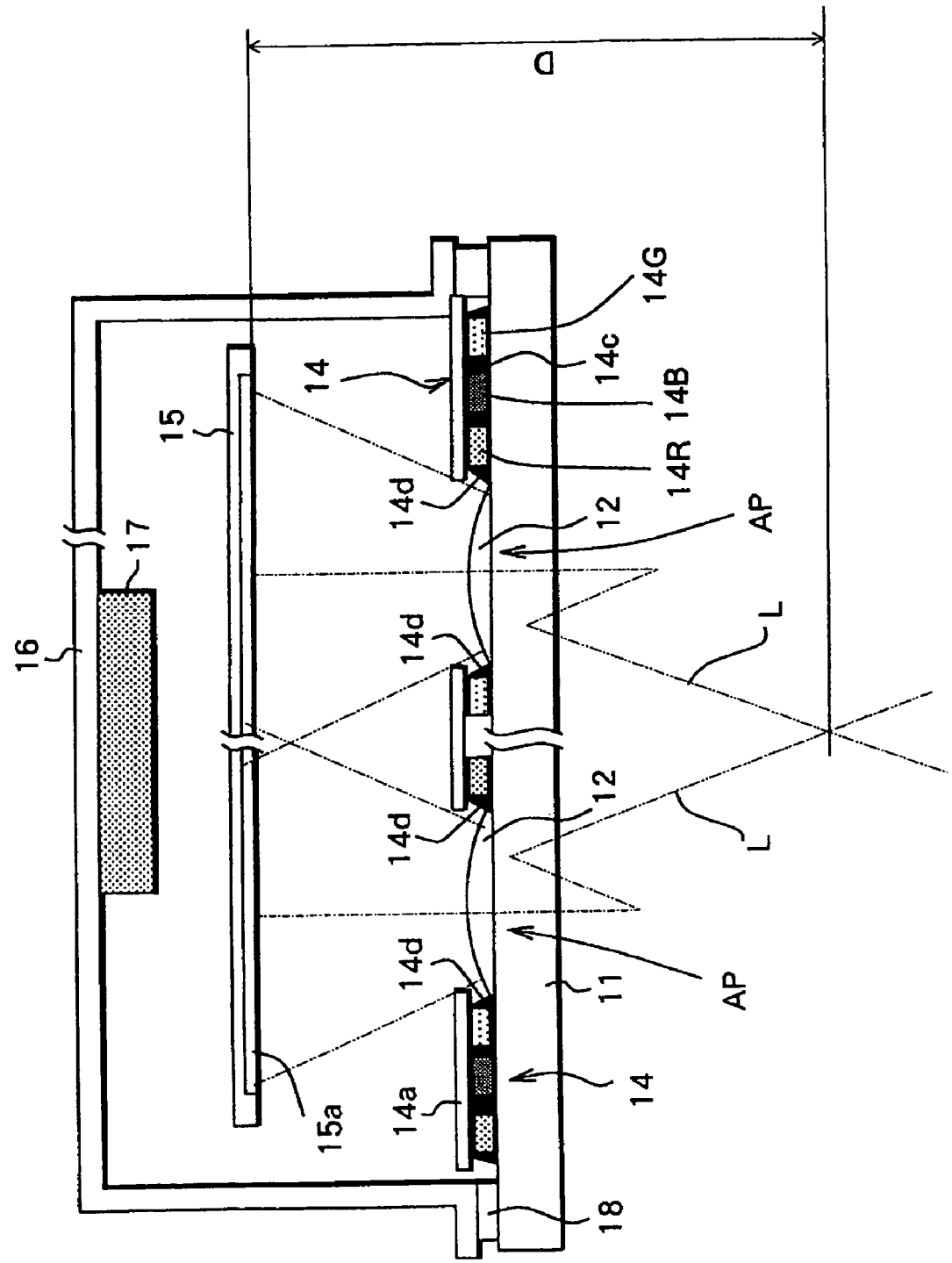
FIG. 1 is a sectional view of a display apparatus with a camera according to Embodiment 1 of the present invention.
Figure 2:
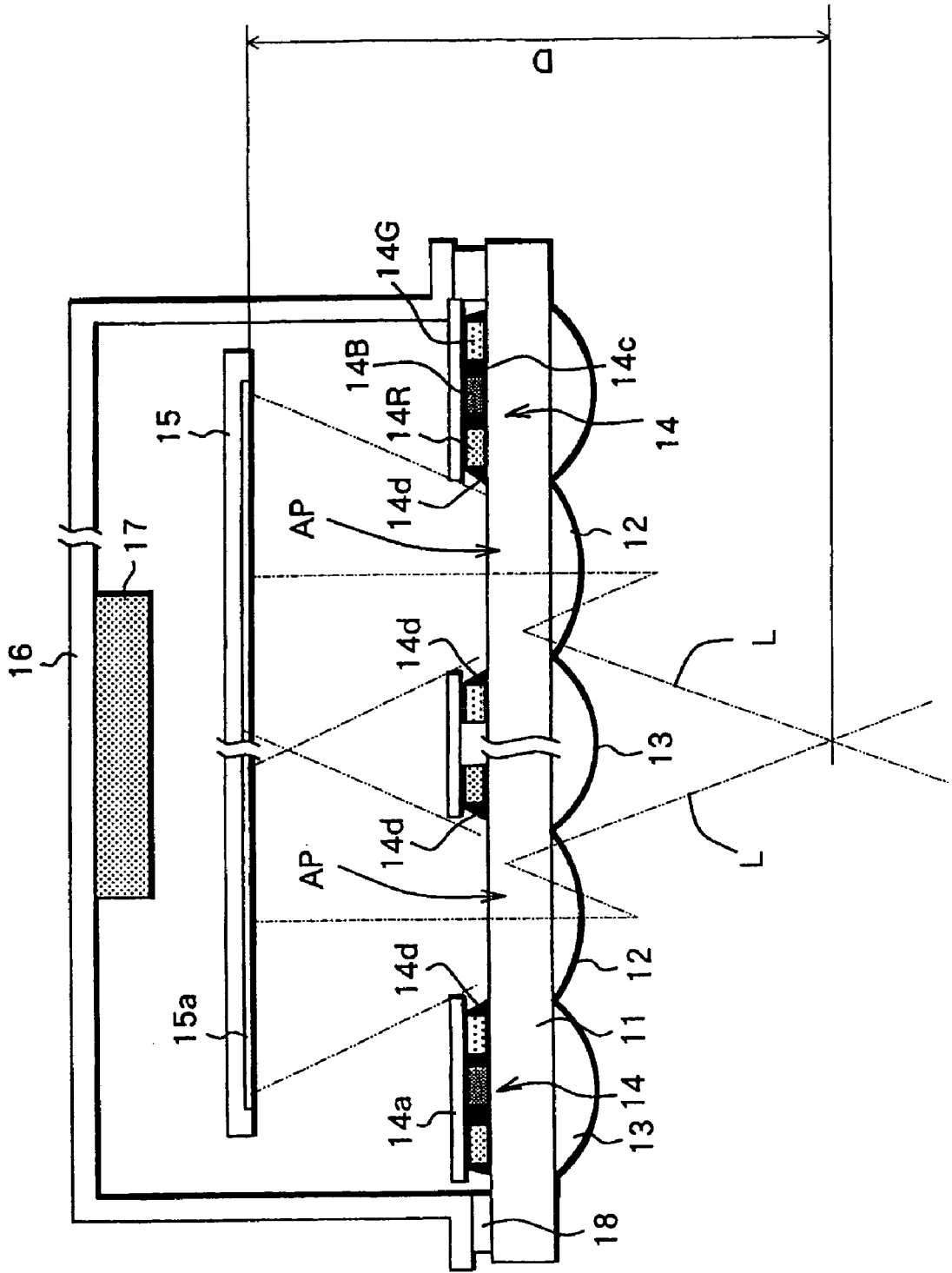
FIG. 2 is a sectional view of the display apparatus with a camera according to Embodiment 2 of the present invention.

FIGS. 1 and 2 are sectional views of the display section 1 of the portable telephone according to the embodiments. Moreover, FIG. 1 is a sectional view of the display section according to Embodiment 1 of the present invention, and FIG. 2 is a sectional view of the display section according to Embodiment 2 of the present invention.

As shown in FIGS. 1 and 2, the display section 1 comprises a glass substrate 11 which forms a screen on a front face side, an organic EL (electroluminescence) element 14 formed per pixel on a backside of the glass substrate 11 and capable of emitting light in a different color for each pixel, and a sealing case 16 which seals the backside of the glass substrate 11.

The glass substrate 11 has undergone pretreatments, such as having a circuit formed with an antireflection coating and low-temperature polysilicon TFTs (Thin-Film Transistors). And the glass substrate 11 has replica lenses 12 and 13 made from a resin such as acrylic integrally formed therewith.

Here, FIG. 1 shows an example in which the replica lens 12 is formed on a face of the glass substrate 11 having the organic EL element 14 (display pixel) described later formed thereon. FIG. 2 shows an example in which the replica lenses 12 and 13 are formed on the face of an opposite side (outside) to the face of the glass substrate 11 having the organic EL element 14 formed thereon.

The replica lens 12 is an image-taking lens, and is constituted to form an image of a field (downside in the drawing) in a sensor section formed on a sensor substrate 15 described later. The replica lens 13 is a condenser lens for condensing a luminous flux of a light emission of the organic EL element 14 described later.

The organic EL element 14 is driven for each pixel by a transparent circuit of low-temperature polysilicon formed on the glass substrate 11, and each pixel lights up and goes out in a different color. Driving of each organic EL element 14 is controlled so as to display one image for the entire display. Furthermore, as for speed of lighting up and going out, the organic EL element 14 is faster than a conventional liquid crystal and so on by three digits or more, which is especially suited to the embodiments.

The organic EL element 14 comprises an aluminum light reflector 14a to be used as a light reflector and a common electrode, EL layers 14B, 14G and 14R made of an organic material emitting light in blue, green and red, and a black matrix section 14c made of chromic oxide and so on for increasing contrast of the pixels and preventing leakage of light as a black matrix.

The black matrix section 14c also functions as (is made integrally with) an aperture of an image-taking lens 12, and is constituted in a knife-edge form to prevent occurrence of a ghost as shown by 14d in FIGS. 1 and 2.

According to the embodiments, the image-taking lens 12 is disposed for each of a plurality of aperture areas AP formed among the organic EL elements 14 (that is, the display pixels).

The sensor substrate 15 is provided at a position where the image-taking lens 12 approximately comes into focus. The sensor substrate (hereafter, referred to as an image-pickup sensor) 15 is joined to a circuit section not shown and the sealing case 16 by a fixed structure not shown, where a sensor surface 15a is integrally formed with a drive circuit. And it is constituted so that the image-taking lens 12 approximately comes into focus on the sensor surface 15a of the image-pickup sensor 15. Thus, the image-taking module is constituted.

A so-called optical axis L links an image center for image processing of a plurality of sensor areas formed on the sensor surface 15a to the center of the replica lens 12. The optical axis L is constituted to approximately intersect at the position where the person 4 observing the screen (refer to FIG. 3) is supposedly staying (the position away from the sensor surface 15a by a distance D in the drawing). The optical axis L is bent in the drawing. However, it is linearly extended in reality.

The sealing case 16 is comprised of a metal, and is adhered to the glass substrate 11 with a highly moisture-resistant adhesive 18. And a desiccant 17 is adhered to a part of the sealing case 16. This eliminates moisture in the air so that the organic EL elements 14 will not react to the moisture in the air and generate a nonradiative portion called a dark spot. According to this structure, it is possible to provide a flat display apparatus further low-profile than a conventional liquid crystal display apparatus.

FIGS. 4A to 6A are diagrams for describing the image-taking module used for the display apparatus according to the embodiments.

Figure 5:
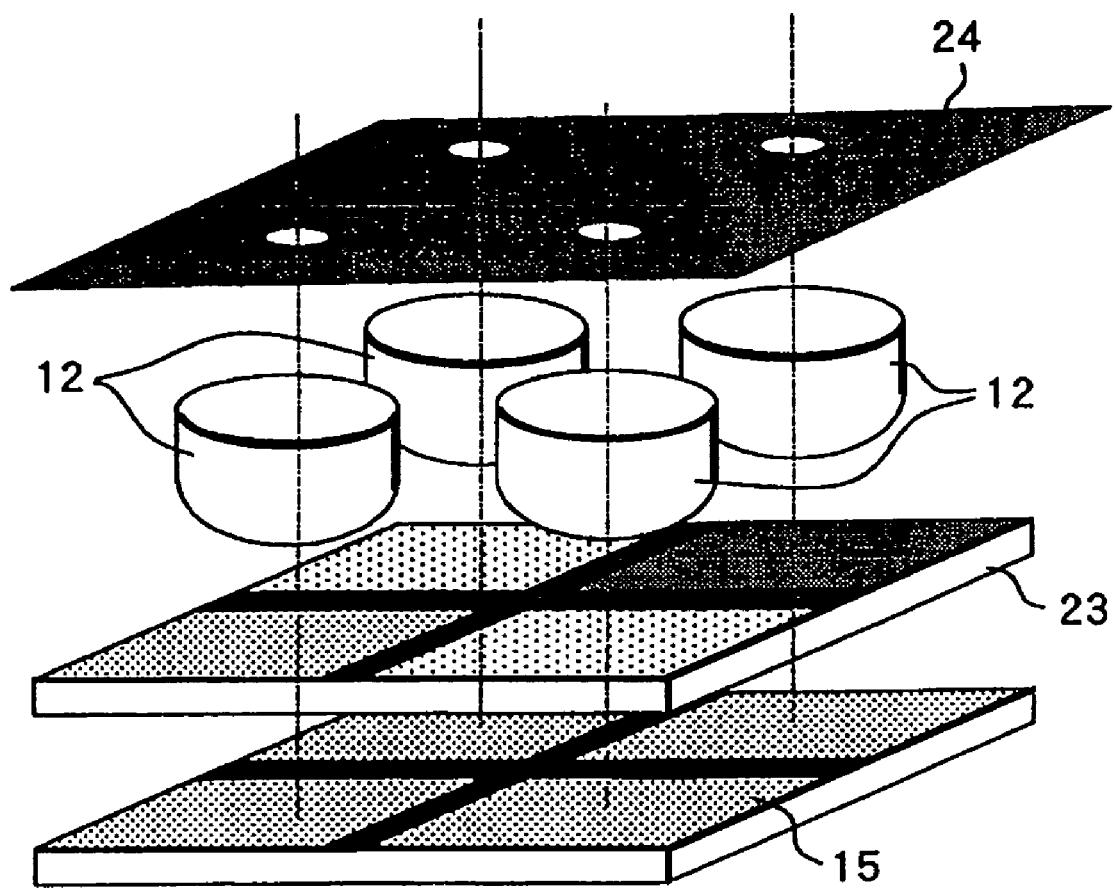
FIG. 5 is a perspective view showing a structure of an image-taking module according to the embodiments.

A so-called compound-eye optical system is used as the optical system of the image-taking module. As shown in FIG. 5, object images formed by the four image-taking lenses 12 are formed on the four image-pickup sensors 15 which are mutually independent so as to synthesize one image out of the four pieces of image information obtained and thereby generate high-quality image information.

Figure 6A:
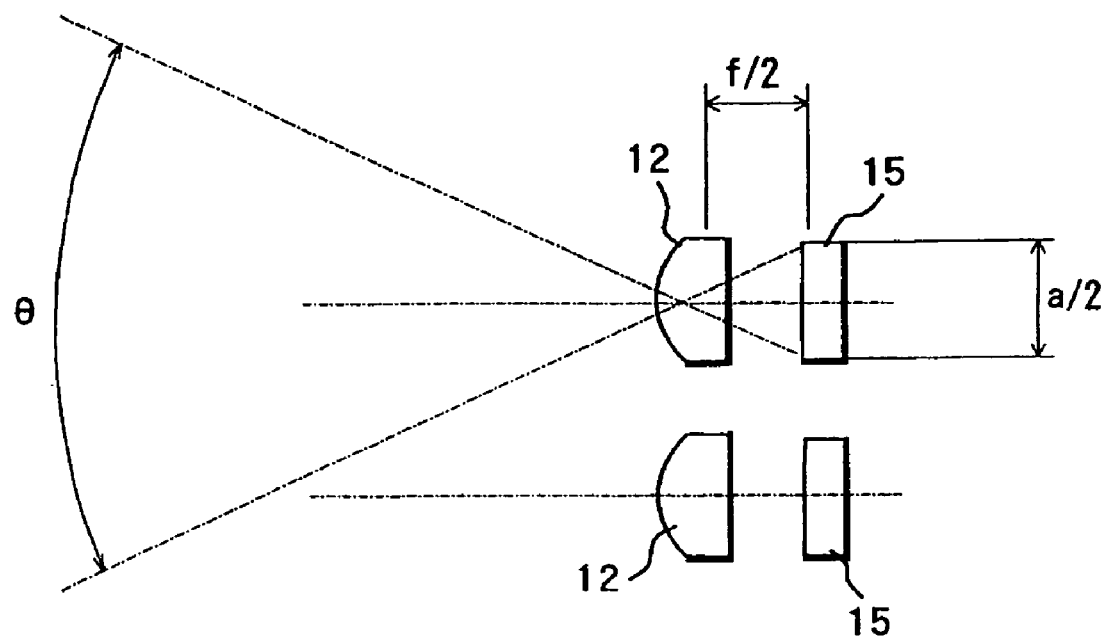
FIGS. 6A and 6B are sectional views schematically showing the image-taking module, where
Figure 6B:
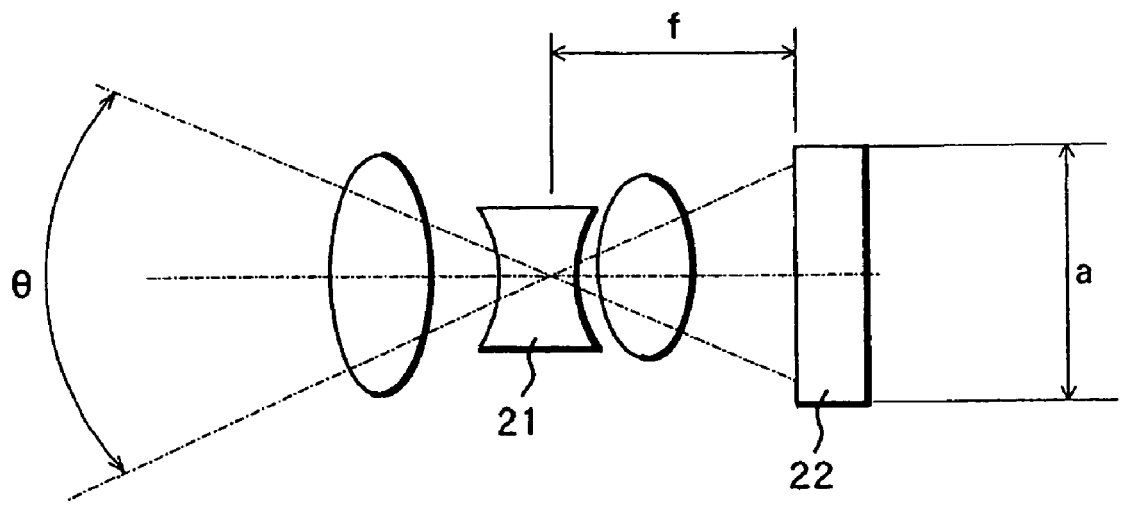

FIGS. 6A and 6B are sectional views of the optical system and image-pickup sensor, where FIG. 6A is the structure of the compound-eye optical system according to the embodiments and FIG. 6B is the structure of a conventional optical system.

In FIG. 6A, reference numeral 12 denotes the replica lens which is the image-taking lens, and 15 denotes the image-pickup sensor. It is the same structure as FIGS. 1 and 2 described above.

FIG. 6B shows the conventional optical system for giving the same performance as the optical system according to the embodiments, where reference numeral 21 denotes a lens unit and 22 denotes an image-pickup sensor. The image-pickup sensor 22 includes color filters in Bayer arrangement (arranged checkerwise).

As is understandable by seeing the lens unit 21, the conventional optical system shown in FIG. 6B uses a technique called achromatization in order to form on the same sensor surface the lights of wavelengths of blue, green and red (hereafter, referred to as B, G, R) which are three primary colors of optical wavelengths. To be more specific, as it is not possible to image the lights of different wavelengths on the same plane with a simple lens, three kinds of lens different in refraction and dispersion (difference in the refraction according to the wavelength) are used so as to image the three primary colors on the same plane. For this reason, the lens unit needs to be thick as shown in the drawing. This achromatization structure of the lens unit is commonly known as apochromat.

A size of the image-pickup sensor 22 used for an ordinary image-taking system is 2.56×1.92 mm assuming that the size of one pixel is 4μ square in the case of VGA (640×480=approx. 300,000 pixels) for instance.

In the case of using the compound-eye optical system including a different optical system for each color as with the embodiments, four image-pickup sensors 15 of 1.28×0.96 mm will be used. It is also feasible, however, to separate a light sensitive range of one image-pickup sensor 15 into a plurality and allocate them to the object images formed by the image-taking lenses 12.

Thus, as for the optical system used in the case of a different screen size, the lens correspond to an F=38 mm lens as a standard angle of field θ of a silver-halide camera is the lens unit 21 of f=2.6 mm for the sensor of 2.56×1.92 mm (=a) in the ordinary optical system for instance. In the case of the sensor of 1.28×0.96 mm (=a/2) in the optical system according to the embodiments, the image-taking lens 12 of f=1.3 mm which is half thereof should be used. To be more specific, according to the embodiments, it is possible to render an image-taking optical system including the lens and image-pickup sensor about half as thick as the ordinary optical system.

If a focal length becomes half, a diameter of the lens of the same brightness also becomes approximately half according to a principle formula D=f/Fno. so that the image-taking lenses become inconspicuous if buried among the display pixels of the display (to be more specific, the area of the four lenses added up becomes almost equal to the size of the aperture of a conventional type lens). As the lens gets out of the center of the screen which is a point carefully looked at by an observer, degradation of an observed image becomes inconspicuous so that it becomes the structure suited to the object of the present invention which is to keep eye contact between calling parties (to take a full-face image of the observer watching the display).

FIG. 5 is a perspective view showing a structure of an image-taking module according to the embodiments. In FIG. 5, reference numeral 12 denotes the image-taking lenses which are replica-formed on the glass substrate 11. The image-taking lenses 12 are disposed at four locations in a central portion of the screen. Reference numeral 23 denotes the color filter which makes only the wavelengths (colors) necessary for the image-pickup sensors 15 of white light having incoming the lenses incident on the respective image-pickup sensors 15. Reference numeral 24 denotes the aperture which printed on the glass substrate 11.

Figure 4A:
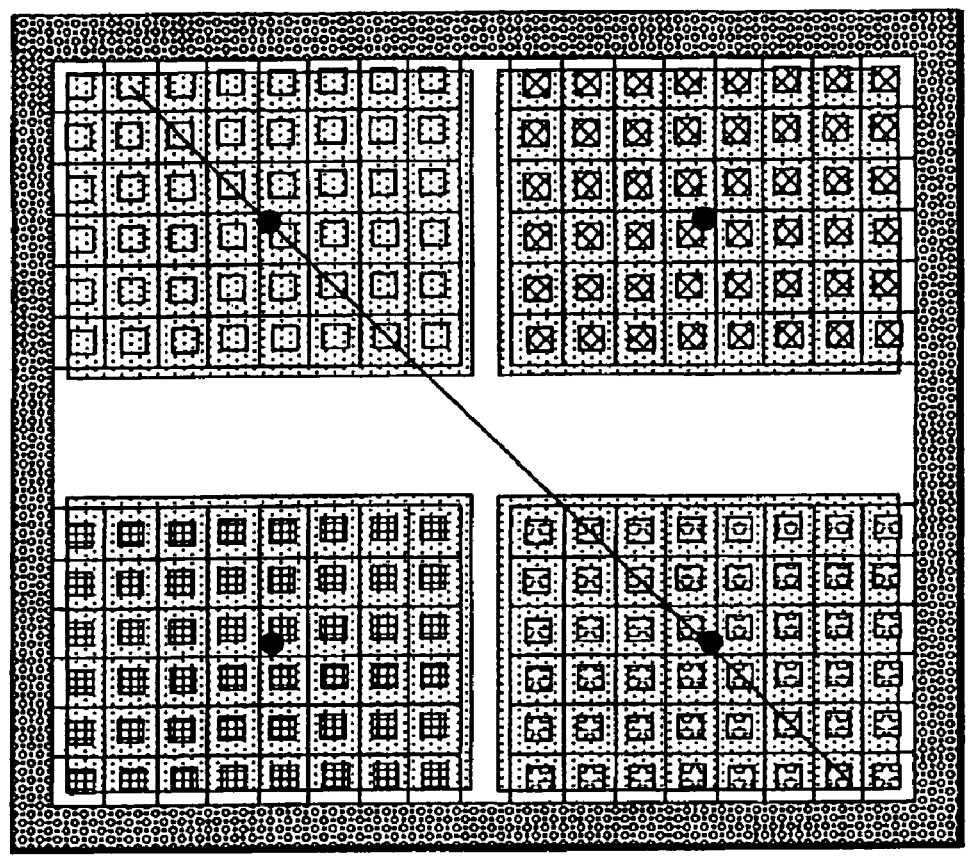
FIGS. 4A, 4B and 4C are description diagrams of a method of processing a taken image of a portable telephone according to the embodiments, where
Figure 4B:
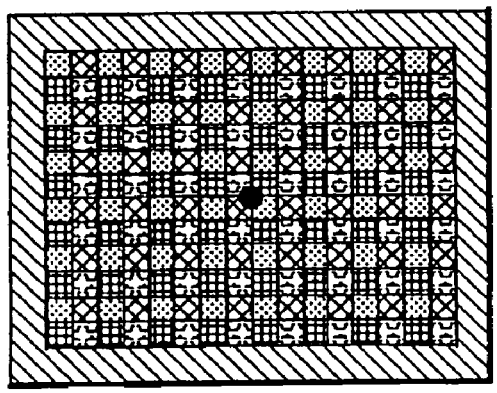
Figure 4C:
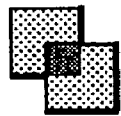

FIGS. 4A, 4B and 4C are description diagrams of a method of processing taken images, where FIG. 4A shows four images taken by four lenses, FIG. 4B shows an image in which the four images in FIG. 4A are electrically superimposed, and FIG. 4C is a detailed drawing.

According to the embodiments, when converting to an electrical signal and reading the object images formed by the incident lights through the four image-taking lenses 12, they are alternately read and combined, such as a most upper right image of the sensor in a second quadrant section in FIG. 4A, and then the most upper right image of a first quadrant section, and then a neighboring image in the first quadrant section, and a neighboring image in the first quadrant section again, for instance, to make the signal of a first odd-numbered line. Next, they are alternately read, such as the most upper right image in a third quadrant section, the most upper right image in a fourth quadrant section, and then a neighboring image in the third quadrant section, and a neighboring image in the fourth quadrant section again to make the signal of a first even-numbered line, and next, the signal in a second row of the second quadrant section . . . . With a circuit which thus alternately reads and combines them, a picture signal correspond to an ordinary Bayer arrangement as in FIG. 4B is generated.

Figure 7:
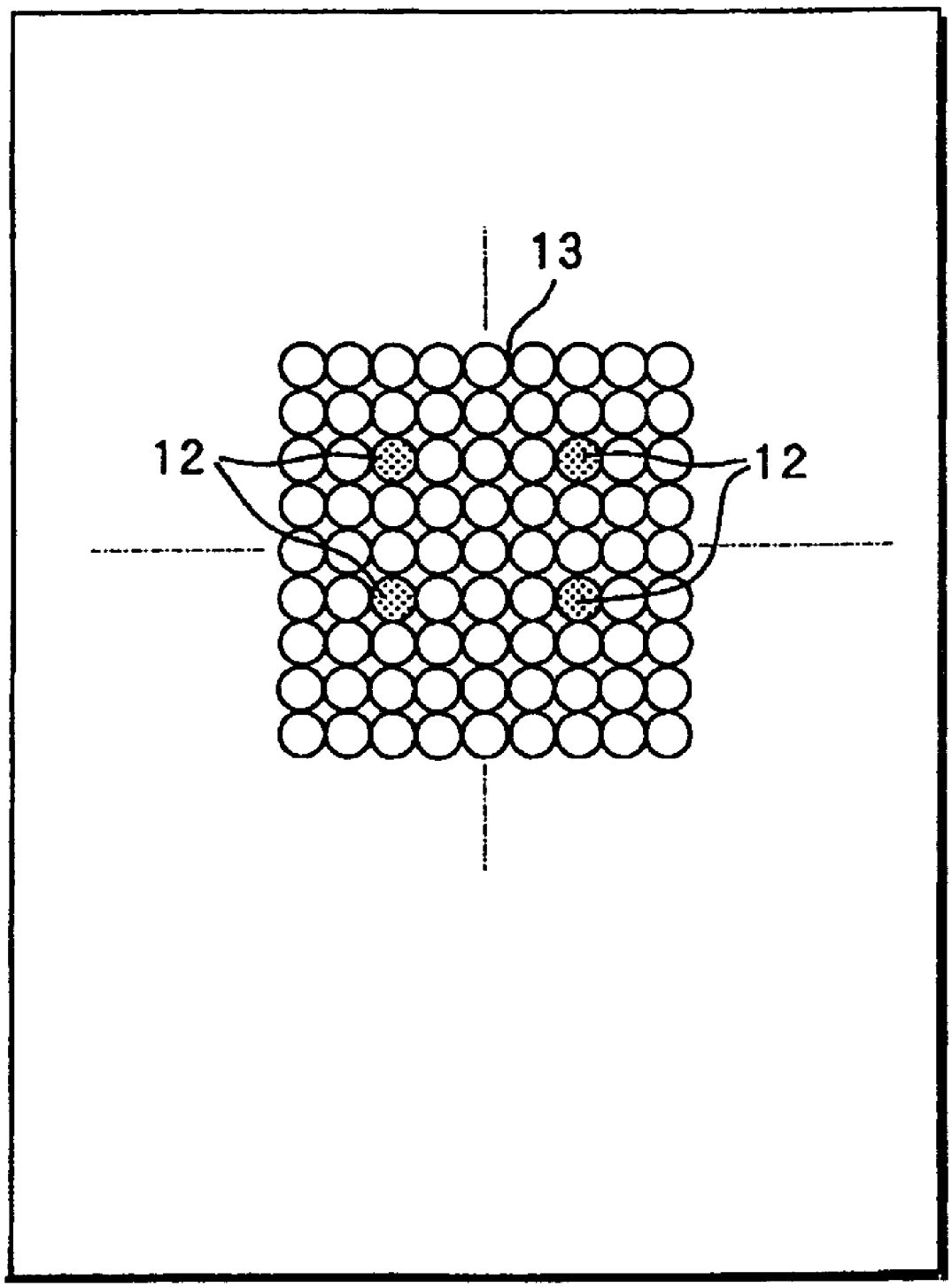
FIG. 7 is a diagram showing an example of placement of sensor units in a display section of the arrangement telephone according to the embodiments.

FIG. 7 is a front view showing an example of arrangement of the image-taking lenses 12 in the display according to the embodiments.

In FIG. 7, reference numeral 12 denotes the image-taking lenses, and 13 denotes the condenser (display) lenses which condense display light. The condenser lenses 13 are described only in the central portion of the screen in FIG. 7. In reality, however, the condenser lenses 13 are disposed all over the screen.

The image-taking lenses 12 are disposed as if scattered almost evenly in the central portion of the screen shown as a square in FIG. 7 as respect to the condenser lenses 13 so that, coupled with their small size, they will not bother the person watching the display.

FIGS. 8A and 8B are diagrams showing another example of the arrangement of the image-taking lenses 12 in the display according to the embodiments, where FIG. 8A is a front view of the display and FIG. 8B is a side view showing the status of use of the display (portable telephone).

In FIG. 8A, one set of four image-taking lenses 12 (that is, four image-taking modules) are disposed at five locations in total which are the central portion of the screen shown as a square in FIG. 8A and the central portions (four corners) of the areas of the screen divided into four. Although the condenser lenses 13 are laid all over the screen, FIG. 8A omits them and describes only the central portion thereof.

And as shown in FIG. 8B, the image-taking optical axes (shown in dashed line in FIG. 8B L of the image-taking modules at the four corners are set to face the direction of the person away from the screen by a distance D (that is, the distance between the screen and the person such as 30 to 50 cm).

Such a structure assumes the cases where, on making calls to a plurality of places or a plurality of persons (portable telephones P1, P2 and a personal computer P3), different places and persons are displayed on the screen divided into four (the divided areas on the screen are not limited to four) respectively.

For instance, it is suited to a communication system such as a video-conference system or a stationary video phone system like the personal computer which arranges common documents and so on in the central portion of the screen and displays the image of the other party in the area correspond to a quarter or so of the entire screen.

It is also possible, just by turning the user's face toward the person in the four corners of the screen, to automatically determine with the personal computer as to the person and place currently in conversation so as to selectively transmit the taken image from the camera to the other party.

Figure 11:
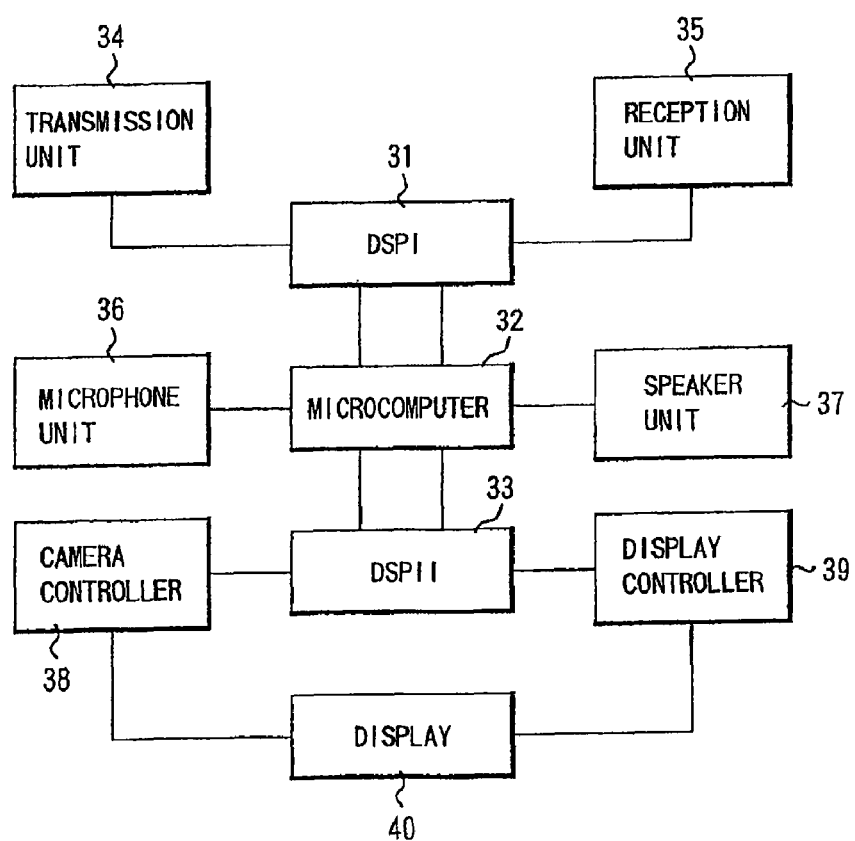
FIG. 11 is a control circuit diagram of the portable telephone according to the embodiments.

FIG. 11 is a control circuit diagram of the portable telephone according to the embodiments. In FIG. 11, reference numeral 31 denotes a DSPI which converts digital signals of transmission and reception at high speed, and it converts and transmits a receiving signal to a microcomputer 32 as a controller and inversely converts a transmitting signal from the microcomputer 32 to a digital transmitting signal. The DSPI incorporates compression and decompression functions for the images and voice.

Reference numeral 33 denotes a DSPII which converts only image signals of transmission and reception separated by the microcomputer 32 to the signals suited to driving the display apparatus at high speed, or converts analog signals from an area sensor (image-pickup sensors 15) of the image-taking module in a display 40 described later to the digital signals and conveys them to the microcomputer 32. Here, the microcomputer 32 also functioning as an image combining section combines one image of the four pieces of image information corresponding to the mutually independent four images formed by the four image-taking lenses 12 as described above.

Reference numerals 34 and 35 denote a transmission unit and a reception unit as communication sections respectively (also shown in FIG. 8A), and 36 and 37 denote a microphone unit and a speaker unit respectively.

Reference numeral 38 denotes a camera controller which controls a camera section, and 39 denotes a display controller which controls an organic EL display section.

Figure 10:
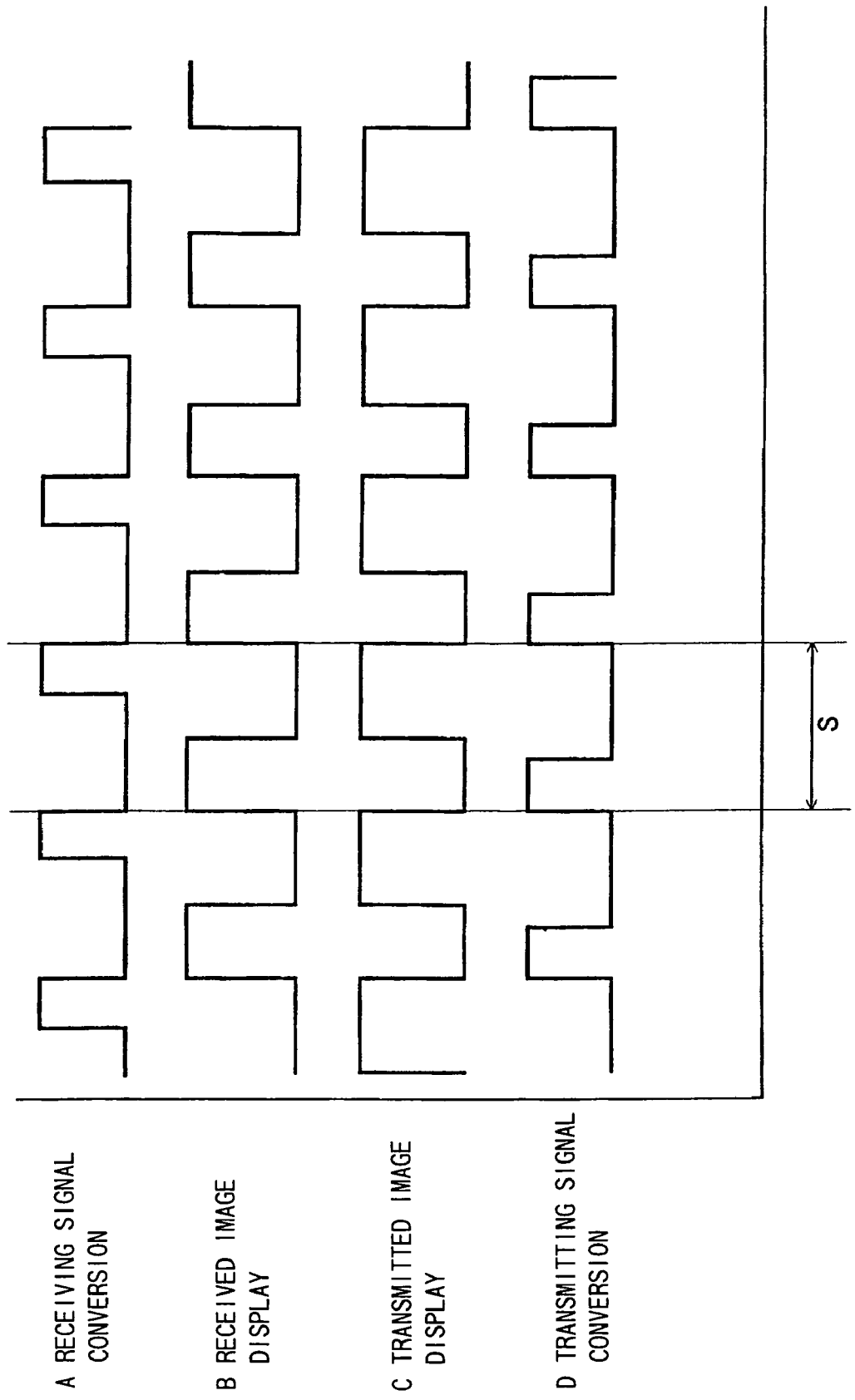
FIG. 10 is a diagram for describing the communication system of the portable telephone according to the embodiments in chronological order.

The camera (image-taking module) section and display section of the display 40 are controlled by the microcomputer 32 in chronological order as shown in FIG. 10.

In FIG. 10, the receiving signal obtained from the reception unit 35 is converted by the DSPI 31 and microcomputer 32 at high speed, and drives the organic EL element of the display 40 via the DSPII 33 and display controller 39. At this time, timing for signal conversion (receiving signal conversion timing) is shown by A in FIG. 10, and the timing for driving of the organic EL element (received image display timing) is shown by B in FIG. 10.

C in FIG. 10 shows the timing in which an image is being taken in the camera section (transmitted image taking timing). The transmitted image taking timing C has an alternate timing relation with light emitting timing (display drive timing) B of the organic EL.

D in FIG. 10 shows the timing in which the image (composite image) taken by the camera section is converted to the image signal by the DSPII 33 and the image signal is converted in real time to the transmitting signal by the microcomputer 32 and DSPI 31 so as to transmit it with the transmission unit 34 (transmitting signal conversion timing).

According to this structure, the light emitting timing (display drive timing) B of the organic EL is totally deviated from the transmitted image taking timing (image taking drive timing of the image-taking module) C. Therefore, the organic EL element is driven so that the light emitting from it should have no adverse affect on the image taking by the built-in image-taking module.

The organic EL element is very much suited to use which requires responsiveness as to the light emitting and extinction.

An interval indicated by "S" in FIG. 10 should ideally be 1/30 second so that a flicker of the image will not be discernible by a user. It may also be 1/10 to 1/15 second in consideration of an information amount of the transmission and reception and the speed of information conversion.

Figure 9:
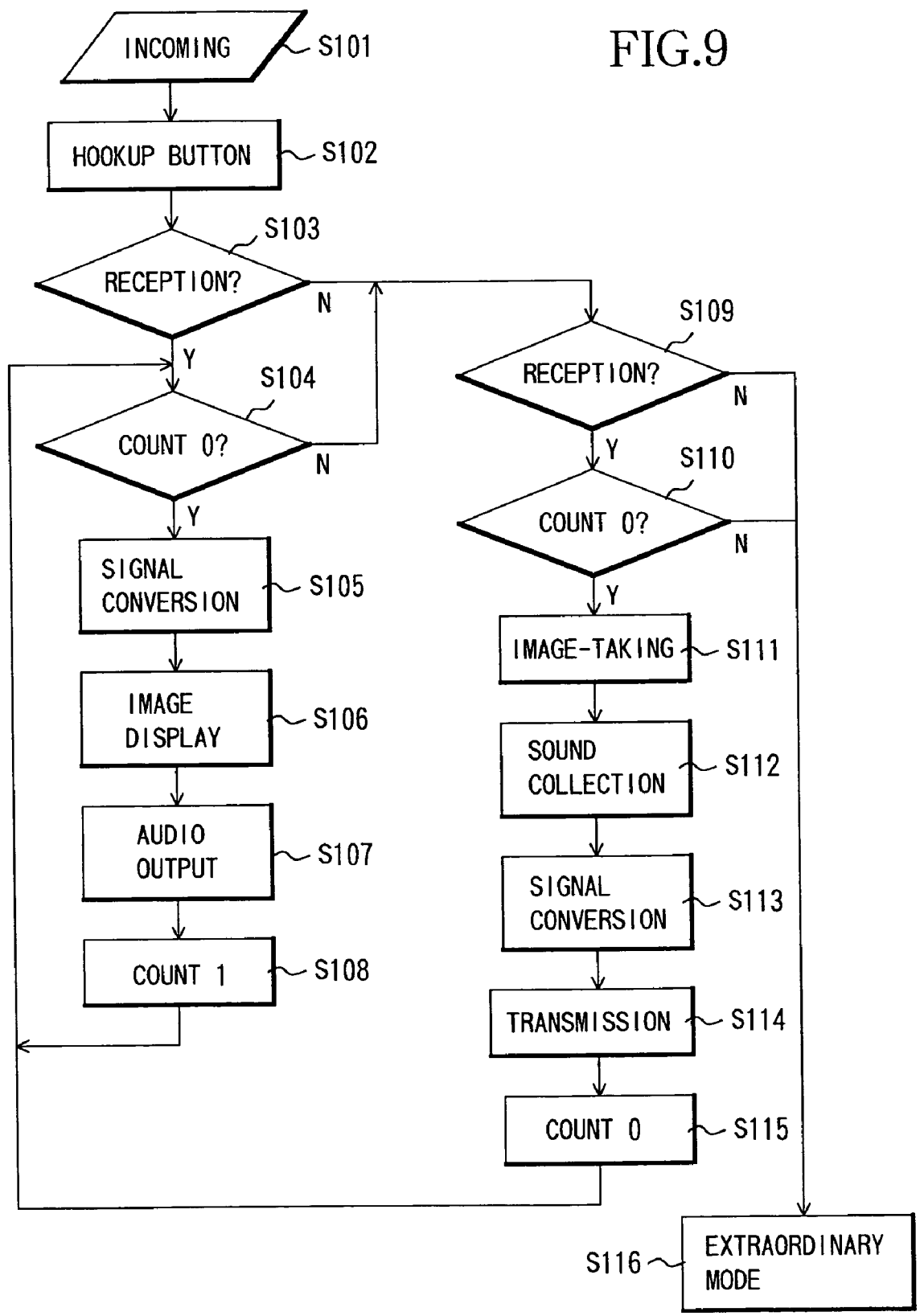
FIG. 9 is a flowchart of a communication system of the portable telephone according to the embodiments.

FIG. 9 is a flowchart of the communication system according to the embodiments. The steps will be described by giving them symbols.

In FIG. 9, incoming (arrival) at the portable telephone starts in S101. In S102, a hookup button is pushed by the user.

In S103, it is determined whether or not the signal has been received. If the signal is received, the process proceeds to S104. If the signal is not received, the process proceeds to S109.

In S104, the microcomputer 32 determines whether or not it is the timing to display the image based on the receiving signal. To be more specific, in the case where a count by a counter is 0, it determines that the timing is right to display the image so as to proceed to S105.

In S105 to S107, the receiving signal is converted via the DSPI 31, DSPII 33 and microcomputer 32, image display performs on the display 40 and voice-outputted to the speaker unit 37.

Thereafter, it changes the counter to 1 in S108, and then it returns to S104.

In the case where the count is 1 in S104, it determines that the timing is right to take an image so as to proceed to S109.

In S109, it is determined whether or not the signal has been received. If the signal is received, the process proceeds to S110. If the signal is not received, the process proceeds to S116 (determined as an extraordinary mode).

In S110, it is determined whether or not the count is 1, that is, whether or not operation of the image-taking operation and sound collection operation may be performed. If the count is 1, the process proceeds to S111. If the count is 0, the process proceeds to S116.

In S111 to S114, the signal conversion is performed by using the image taking, sound collection, DSPII 33 and microcomputer 32 and then the digital signal is transmitted by using the DSPI 31 and transmission unit 34.

Thereafter, the counter is reset to 0 in S105, and then it returns to S104 again.

An interval at this time is S indicated in previously described FIG. 10.

It is possible, by such operation of the microcomputer 32 and so on, to make the user feel as if the display on the display screen and the image taking by the image-taking module are simultaneously performed.

As described above, according to the embodiments, the image is obtained by combining the image information obtained by photoelectrically converting the plurality of object images formed through the plurality of aperture areas formed among the display pixels. Therefore, it is possible to take a full-face image of the person (observer) watching the display while keeping it inconspicuous to the person. Thus, it is possible to operate the portable telephone and video phone (video-conference) system in a comfortable state.

Furthermore, according to the embodiments, a so-called compound-eye image-taking module is constituted so that a wide image-taking angle of field as a whole can be obtained even though each aperture area is small. Therefore, it is possible to constitute the image-taking module with a short focal length, that is, the structure thin enough to be in a narrow space so as to prevent the display apparatus from becoming thick by having the image-taking module built therein.

Furthermore, the optical axes of the plurality of image-taking lenses intersect at a position of a predetermined distance on the object side (position of the observer's face, for instance), (and the pixels in the image-pickup sensor area where the object images are taken are spatially deviated at the object position) so that the image of the object at the position can be taken in high resolution.

It is possible, by arranging the aperture area at the position separated from the central portion of the display screen, to deviate an image-taking position from the point carefully looked at by the observer. And it is possible, by creating the combining image of a plurality of pieces of image-taking (image) information, to make the image look like the one taken from the center of the display screen.

According to the embodiments, it is possible to prevent degradation of the taken images due to the light from the display side by continuously driving the display by alternately deviating the display timing and image-taking timing thereof.

While preferred embodiments have been described, it is to be understood that modification and variation of the present invention may be made without departing from the scope of the following claims.

"This application claims priority from Japanese Patent Application No. 2003-415820 filed on Dec. 12, 2003, which is hereby incorporated by reference herein."

What is claimed is:

1. A display apparatus with a camera, comprising:
    a display element in which a plurality of display pixels are arranged on a transparent substrate;
    a plurality of image-taking lenses which are arranged on the transparent substrate;
    a plurality of display lenses which emits light from the display pixels to an object side and are arranged on the transparent substrate;
    a photoelectric conversion element which photoelectrically converts object images into image data, wherein the same object images are formed on different areas of the photoelectric conversion element by each of the plurality of image-taking lenses; and
    an image combining section which combines the plural image data, which are output from the photoelectric conversion element by photoelectrically converting the same object images which are formed on the different areas, to generate one image data
    wherein the display pixel includes a black matrix section, and the black matrix section of the display pixel adjacent to the image-taking lens has a knife-edge form to prevent occurrence of a ghost.

2. The display apparatus according to claim 1, wherein a size of the image-taking lens is equal to or less than a size of the display pixel.

3. The display apparatus according to claim 1, wherein the image-taking lenses are provided at positions away from a center of a display surface on the display element.

4. The display apparatus according to claim 1, wherein the display apparatus comprises a plurality of image-taking modules and image taking modules are provided at a plurality of locations of the display elements.

5. The display apparatus according to claim 1, wherein the display element is an organic electroluminescence element.

6. The display apparatus according to claim 1, further comprising:
    a controller which drives the display element and the photoelectric conversion element in different timing.

7. A communication apparatus comprising:
    the display apparatus according to claim 1; and
    a communication section which performs communication with image information by using the display apparatus.

* * * * *